United States Patent [19]
Lawson et al.

[11] Patent Number: 6,025,450
[45] Date of Patent: *Feb. 15, 2000

[54] AMINE CONTAINING POLYMERS AND PRODUCTS THEREFROM

[75] Inventors: David F. Lawson, Uniontown; Mark L. Stayer, Jr., Suffield; David Saffles, Massillon, all of Ohio; Koichi Morita, Tokyo, Japan; Yoichi Ozawa, Tokyo, Japan; Ryota Fujio, Tokyo, Japan; Thomas A. Antkowiak, Wadsworth, Ohio

[73] Assignee: Bridgestone Corporation, Tokyo, Japan

[*] Notice: This patent is subject to a terminal disclaimer.

[21] Appl. No.: 09/112,913

[22] Filed: Jul. 9, 1998

Related U.S. Application Data

[63] Continuation of application No. 08/973,000, Nov. 9, 1997, abandoned, which is a continuation of application No. 08/625,928, Apr. 1, 1996, abandoned, which is a continuation of application No. 08/328,985, Oct. 25, 1994, abandoned, which is a continuation-in-part of application No. 08/065,791, May 24, 1993, abandoned, which is a continuation-in-part of application No. 07/955,969, Oct. 2, 1992, Pat. No. 5,332,810.

[51] Int. Cl.$^7$ .................................................. C08F 36/04
[52] U.S. Cl. ..................... 526/340; 526/180; 526/335; 526/346; 525/105; 525/342; 525/359.1; 525/370; 525/371; 525/374; 525/375; 525/382; 525/383; 524/571; 524/572; 524/575; 524/577; 152/209 R
[58] Field of Search ........................... 524/575, 571, 524/572, 577; 526/180, 335, 340, 346; 525/105, 342, 359.1, 370, 371, 374, 375, 382, 383; 152/209 R

[56] References Cited

U.S. PATENT DOCUMENTS

| | | | |
|---|---|---|---|
| 2,849,432 | 8/1958 | Kibler et al. | 260/94.2 |
| 3,109,871 | 11/1963 | Zalinski et al. | 260/85.1 |
| 3,177,190 | 4/1965 | Hsieh | 260/94.2 |
| 3,178,398 | 4/1965 | Strobel et al. | 260/85.1 |
| 3,240,772 | 3/1966 | Natta et al. | 260/88.7 |
| 3,290,277 | 12/1966 | Anderson et al. | 260/88.2 |
| 3,317,918 | 5/1967 | Foster | 260/83.7 |
| 3,326,881 | 6/1967 | Uraneck et al. | 260/94.6 |
| 3,331,821 | 7/1967 | Strobel | 260/83.7 |
| 3,393,182 | 7/1968 | Trepka | 260/79.5 |
| 3,426,006 | 2/1969 | Nützel et al. | 260/83.5 |
| 3,439,049 | 4/1969 | Trepka | 260/624 |
| 3,856,877 | 12/1974 | Otsuki et al. | 260/677 R |
| 3,935,177 | 1/1976 | Muller et al. | 260/84.7 |
| 4,015,061 | 3/1977 | Schulz et al. | 526/178 |
| 4,026,865 | 5/1977 | Uraneck et al. | 260/42.32 |
| 4,085,265 | 4/1978 | Otsuki et al. | 526/49 |
| 4,230,841 | 10/1980 | Prudence | 526/179 |
| 4,247,418 | 1/1981 | Halasa et al. | 252/431 N |

(List continued on next page.)

FOREIGN PATENT DOCUMENTS

| | | |
|---|---|---|
| 0 067 111 A2 | 5/1982 | European Pat. Off. .......... B60C 1/00 |
| 0 180 141 A1 | 10/1985 | European Pat. Off. ........ C08C 19/44 |
| 0 207 565 A1 | 6/1986 | European Pat. Off. ........ C08C 19/44 |
| 0 264 506 A1 | 10/1986 | European Pat. Off. ........ B60C 21/08 |
| 0 282 437 A2 | 3/1988 | European Pat. Off. .......... C08F 4/44 |
| 0 290 883 A1 | 4/1988 | European Pat. Off. . |
| 0 316 255 A2 | 10/1988 | European Pat. Off. . |
| 0 423 087 A2 | 5/1990 | European Pat. Off. . |
| 0 451 603 A2 | 3/1991 | European Pat. Off. . |
| 2 250 774 | 11/1974 | France . |
| 2 447 938 | 1/1980 | France . |
| 138 070 | 10/1979 | Germany . |
| 247455 | 3/1986 | Germany . |
| 54-22484 | 2/1979 | Japan . |
| 54-65788 | 5/1979 | Japan . |
| 59-164308 | 9/1984 | Japan . |
| 2 117 778 | 3/1983 | United Kingdom . |

OTHER PUBLICATIONS

"Asymmetric Deprotonation: A New Route to Chiral Compounds" by Niegel S. Simpkins, *Journal of the Chemical Society, Chemical Communications*, pp. 88–90, 1986.

"[H$_2$C(CH$_2$)$_5$NLi]$_6$, die erste cyclisierte Lithiumamid–Leiter: Synthese und Struktur von Hexamethylenimidolithium" by D. Barr et al., *Angewandte Chemie*, vol. 101, No.9, pp. 1279–1280, 1989 (in German).

One page Derwent Abstract of Japanese Patent 54022484.

"3–Dimethylaminoproply–Lithium–An Analytical and Kinetic Investigation of a New Initiator System for Polymer Synthesis" by Eisenbach et al., *European Patent Journal*, vol. 11, pp. 699–704 (1975).

"A Bifunctional Anionic Initiator Soluble in Non–polar Solvents" by Beinert et al., *Makromol. Chem 179*, pp. 551–555 (1978).

(List continued on next page.)

*Primary Examiner*—Fred Teskin
*Attorney, Agent, or Firm*—Daniel N. Hall; Arthur M. Reginelli

[57] ABSTRACT

A functionalized polymer includes a polymer chain carrying at least one functional group selected from alkyl, dialkyl and cycloalkyl amine radicals having the general formula

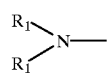

and cyclic amine radicals having the general formula

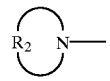

where $R_1$ is an alkyl, cycloalkyl or aralkyl having from 1 to about 12 carbon atoms, and $R_2$ is an alkylene, substituted alkylene, oxy- or N-alkylamino-alkylene group having from about 3 to about 16 methylene groups. The invention also provides products based upon such polymers.

37 Claims, No Drawings

U.S. PATENT DOCUMENTS

| | | |
|---|---|---|
| 4,316,001 | 2/1982 | Boileau et al. ............................ 528/14 |
| 4,383,085 | 5/1983 | Fujimaki et al. . |
| 4,414,372 | 11/1983 | Farnham et al. ......................... 526/190 |
| 4,429,091 | 1/1984 | Hall ......................................... 526/181 |
| 4,476,240 | 10/1984 | Hall et al. ................................ 502/155 |
| 4,478,953 | 10/1984 | Yuki et al. ............................... 502/155 |
| 4,515,922 | 5/1985 | Sakakibara et al. ....................... 525/99 |
| 4,614,771 | 9/1986 | Watanabe et al. ....................... 525/351 |
| 4,616,069 | 10/1986 | Watanabe et al. ....................... 525/370 |
| 4,647,634 | 3/1987 | Jalics ....................................... 526/174 |
| 4,677,153 | 6/1987 | Kitahara et al. ......................... 524/552 |
| 4,734,461 | 3/1988 | Roggero et al. ......................... 525/293 |
| 4,735,994 | 4/1988 | Rogger et al. ........................... 525/279 |
| 4,736,003 | 4/1988 | Schneider et al. ....................... 526/190 |
| 4,791,174 | 12/1988 | Bronstert et al. ....................... 525/274 |
| 4,816,520 | 3/1989 | Bronstert ................................. 525/285 |
| 4,835,209 | 5/1989 | Kitagawa et al. ....................... 524/507 |
| 4,843,120 | 6/1989 | Halasa et al. .............................. 525/53 |
| 4,894,409 | 1/1990 | Shimada et al. ......................... 524/492 |
| 4,914,147 | 4/1990 | Mouri et al. ............................. 524/495 |
| 4,931,376 | 6/1990 | Ikematsu et al. ........................ 526/164 |
| 4,935,471 | 6/1990 | Halasa et al. ......................... 525/359.1 |
| 4,978,754 | 12/1990 | Ibi et al. .................................. 544/176 |
| 5,066,729 | 11/1991 | Stayer, Jr. et al. ....................... 525/315 |
| 5,112,929 | 5/1992 | Hall ......................................... 526/181 |
| 5,115,035 | 5/1992 | Shiraki et al. ........................... 525/314 |
| 5,149,457 | 9/1992 | Smith ................................. 252/182.12 |
| 5,153,159 | 10/1992 | Antkowiak et al. ..................... 502/155 |
| 5,196,138 | 3/1993 | Smith, Jr. ........................... 252/182.12 |
| 5,238,893 | 8/1993 | Hergenrother et al. ................. 526/180 |
| 5,292,790 | 3/1994 | Shimizu et al. ......................... 524/496 |
| 5,332,810 | 7/1994 | Lawson et al. .......................... 526/180 |
| 5,393,721 | 2/1995 | Kitamura et al. ....................... 526/180 |
| 5,527,753 | 6/1996 | Engel et al. ............................. 502/155 |
| 5,552,473 | 9/1996 | Lawson et al. ...................... 524/577 X |

OTHER PUBLICATIONS

"An improved synthesis of p–dimethylaminophenyl-–lithium" by Hallas et al., *Chemistry and Industry*, p. 620 (1969).

"Anionic Polymerization. VII Polymerization and Copolymerization with Lithium Nitrogen–Bonded Initiator" by Cheng, *American Chemical Society*, pp. 513–528 (1981).

"Anionic Polymerization Initiators Containing Protected Functional Groups and Functionally Terminated Diene Polymers" by Schulz et al., *Journal of Polymer Science: Polymer Chemistry Edition*, vol.12, pp. 153–166 (1974).

"Anionic Polymerization Initiated by Diethylamide in Organic Solvents. I. The Use of Lithium Diethylamide as a Polymerization Catalyst and the Effect of Solvent Type on the Polymerization of Isoprene and Styrene" by Angood et al., *Journal of Polymer Science: Polymer Chemistry Edition*, vol. 11, pp. 2777–2791 (1973).

"Anionic Polymerization Initiators Containing Protected Functional Groups. II. " by Schulz et al., *Journal of Polymer Science: Polymer Chemistry Edition*, vol. 15, pp. 2401–2410 (1977).

"Bifunctional anionic intiators: A critical study and overview" by Bandermann et al., *Makromol. Chem 186*, pp. 2017–2024 (1985).

"Butadiene–Styrene Copolymerization Initiated by n–BuLi/ THF/t–AmOK", by Lehong et al., *Journal of Applied Polymer Science*, vol. 44, pp. 1499–1505 (1992).

"6001 Chemical Abstracts", vol. 91, p.59 (1979).

"Copolymerization of Butadiene and Styrene by Initiation with Alkyllithium and Alkai Metal tert–Butoxides" by Wofford et al., *Journal of Poloymer Science: Part A–1*, vol. 7, pp. 461–469 (1969).

"Lithium Amide Catalyzed Amine–Olefin Addition Reactions" by Schlott et al., *J. Org. Chem.*, vol. 37, No. 26, pp. 4243–4245 (1972).

"New perfectly difunctional organolithium initiators for block copolymer synthesis: Synthesis of dilithium initiators in the absence of polar additives", by Guyot et al., *Polymer*, vol. 22 (1981).

"Polymerization of Unsaturated Compounds in the Presence of Lithium Diethylamide" by Vinogradov et al., *Polymer Science U.S.S.R.*, vol. 4, pp. 1568–1572 (1963).

"Ortho Lithiation via a Carbonyl Synthon" by Harris et al., *J. Org. Chem.*, vol. 44, No. 12, pp. 2004 & 2006 (1979).

"Preparation and Reactions of Trialkyltinlithium" by Tamborski et al., pp. 237–239, Jan. 1963.

"Preparation of Some Trialkyltin–lithium Compounds" by Gilman et al., *J. Am. Chem. Soc.* 75, pp. 2507–2509 (1953).

"Some Reactions of Tributyl–and Triphenyl–stannyl Derivatives of Alkali Metals" by Blake et al., *J. Chem. Soc.*, pp. 618–622, (1961).

"Specific Functionalization of Polymers by Carboxyl Groups" by Broze et al., *Makromol. Chem. 179*, pp. 1383–1386 (1978).

"Stereospecific Addition Reaction Between Butadiene and Amines" by Imai et al., *Tetrahedron Letters No. 38*, pp. 3317–3520 (1971).

"Studies of the Anionic Polymerization of Phenyl Vinyl Sulfoxide and Its Copolymer with Styrene" by Kanga et al., *Macromolecules 23*, pp. 4235–4240 (1990).

"Synthesis of New Monomers by Addition Reactions of Diethylamine to 1,4–Divinylbenzene Catalyzed by Lithium Diethylamide" by Tsuruta et al., *Makromol. Chem, 177*, pp. 3255–3263 (1976).

"The Microstructure of Butadiene and Styrene Copolymers Sythesized with n–BuLi/THF/t–AmOK" by Lehong et al., *Journal of Applied Polymer Science*, vol. 44, pp. 1507–1511 (1992).

"Thermal Elimination of Poly(Phenyl vinyl sulfoxide) and Its Polystyrene Block Copolymers" by Kanga et al., *Macromolecules 23*, pp. 4241–4246 (1990).

One page translation of Japanese Abstract, Japanese Patent Application 87–180892/26.

One page Derwent Abstract of Japanese Patent JP54065788.

"Anionic Polymerization Initiated by Lithium Diethylamide in Organic Solvents. II. Investigation of the Polymerization of Isoprene" by Angood et al., *Journal of Polymer Science: Polymer Chemistry Edition*, vol. 13, pp. 2437–2452, 1975.

AMINE CONTAINING POLYMERS AND PRODUCTS THEREFROM

RELATED APPLICATION

This application is a continuation of U.S. Ser. No. 08/973,000 filed on Nov. 19, 1997, now abandoned, which is a file wrapper continuation of U.S. patent application Ser. No. 08/625,928, filed Apr. 1, 1996, now abandoned, which is a file wrapper continuation of U.S. patent application Ser. No. 08/328,985, filed Oct. 25, 1994, now abandoned, which is a continuation-in-part of U.S. patent application Ser. No. 08/065,791, filed May 24, 1993, now abandoned, which is a continuation-in-part application of U.S. patent application Ser. No. 07/955,969, filed Oct. 2, 1992, which is now U.S. Pat. No. 5,332,810.

TECHNICAL FIELD

The subject invention relates to anionic polymerizations resulting in diene polymer and copolymer elastomers. More particularly, the present invention relates to polymerization employing a solubilized amine initiator. Specifically, the invention relates to a solubilized lithium amine initiator which is soluble in acyclic alkane solvents, and which will reproducibly polymerize monomers in a controllable and narrow molecular weight distribution range.

BACKGROUND ART

When conducting polymerizations on a commercial basis, it is important to utilize process conditions and components which will allow the molecular weight of the end products to be narrowly and reproducibly defined. The characteristics of a given polymer and its usefulness are dependent, among other things, upon its molecular weight. Hence, it is desirable to be able to predict with some certainty the molecular weight of the end product of the polymerization. When the molecular weight is not narrowly definable, or is not reproducible on a systematic basis, the process is not commercially viable.

In the art, it is desirable to produce elastomeric compounds exhibiting reduced hysteresis characteristics. Such elastomers, when compounded to form articles such as tires, power belts and the like, will show an increase in rebound, a decrease in rolling resistance and will have less heat build-up when mechanical stresses are applied.

A major source of hysteretic power loss has been established to be due to the section of the polymer chain from the last cross link of the vulcanizate to the end of the polymer chain. This free end cannot be involved in an efficient elastically recoverable process, and as a result, any energy transmitted to this section of the cured sample is lost as heat. It is known in the art that this type of mechanism can be reduced by preparing higher molecular weight polymers which will have fewer end groups. However, this procedure is not useful because processability of the rubber with compounding ingredients and during shaping operations decreases rapidly with increasing molecular weight.

It is difficult to obtain consistent properties, such as a reduction in hysteresis properties, if the polymer cannot be controllably reproduced in a narrow molecular weight range distribution. See, for example, U.S. Pat. No. 4,935,471, in which some polymers are prepared with a heterogeneous mixture of certain secondary amines, including lithium pyrrolidide. Polymers made in this manner have widely variable molecular weights, broad polydispersities, and their functional terminations tend to reproduce erratically, giving rise to poorly reproducible hysteresis reduction results.

A major drawback with many of these known initiators, is that they are not soluble in acyclic alkanes, such as hexane. Polar solvents have heretofore been employed including the polar organic ethers such as dimethyl or diethyl ether, tetrahydrofuran, tetramethylethylenediamine, or diethylene glycol methyl ether (diglyme).

The present invention provides novel initiators for anionic polymerization, which are soluble in acyclic alkanes. The invention provides for the incorporation of a functionality from the initiator to be incorporated at the head and tail of the polymer chain. The invention provides for efficient, controllable and reproducible polymerizations, with the preparation of well defined end-products of a relatively narrow molecular weight range distribution.

DISCLOSURE OF THE INVENTION

It is therefore, an object of the present invention to provide an anionic polymerization initiator which is soluble in acyclic alkanes.

It is a further object of the present invention to provide a method of preparing such an anionic polymerization initiator.

It is still a further object of the invention to provide an initiator which will reproducibly result in a polymer within a narrow, predictable molecular weight range.

It is another object of the present invention to provide elastomers formed with such a polymerization initiator.

It is also an object of certain embodiments of the present invention to provide diene polymers and copolymers having reduced hysteresis characteristics.

It is a further object of the present invention to provide vulcanizable elastomeric compounds of diene polymers and copolymers having reduced hysteresis characteristics.

Still another object of the present invention is to provide an improved tire formed from an elastomer as described hereinabove.

At least one or more of these objects together with the advantages thereof over the existing art, which shall become apparent from the specification which follows, are accomplished by the invention as hereinafter described and claimed.

In general, according to the present invention, an anionic polymerization initiator which is soluble in acyclic alkane solvents, comprises a solubilized lithio amine having the general formula

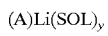

where y is from about 1 to about 3; SOL is a solubilizing component selected from the group consisting of hydrocarbons, ethers, amines or mixtures thereof; and, A is selected from the group consisting of alkyl, dialkyl and cycloalkyl amine radicals having the general formula

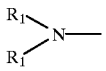

and cyclic amines having the general formula

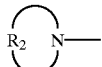

where $R_1$ is selected from the group consisting of alkyls, cycloalkyls or aralkyls having from 1 to about 12 carbon atoms, and $R_2$ is selected from the group consisting of an alkylene, substituted alkylene, oxy- or N-alkylaminoalkylene group having from about 3 to about 16 methylene groups.

There is also provided a method of preparing an anionic polymerization initiator, which method comprises the steps of reacting an organolithium compound with a functionalizing agent in the presence of a solubilizing agent; the functionalizing agent being selected from the group consisting of alkyl, dialkyl and cycloalkyl amine radicals having the general formula

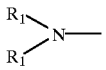

and cyclic amines having the general formula

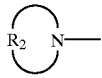

where $R_1$ and $R_2$ are as defined hereinabove; and, the solubilizing agent is selected from the group consisting of hydrocarbons, ethers, amines or mixtures thereof.

A method of preparing an anionic polymerization initiator comprises the steps of reacting an organolithium compound with a functionalizing agent to form a reaction product. The functionalizing agent is selected from the group consisting of alkyl, dialkyl and cycloalkyl amine radicals having the general formula and cyclic amines having the general formula

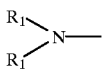

and cyclic amines having the general formula

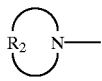

where $R_1$ and $R_2$ are as defined hereinabove. The method also comprises the step of reacting the reaction product with a solubilizing agent selected from the group consisting of hydrocarbons, ethers, amines or mixtures thereof.

A functionalized polymer comprises a polymer chain carrying at least one functional group A wherein A is derived from a polymerization initiator having the general formula

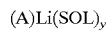

(A)Li(SOL)$_y$ where y is of from about 1 to about 3; SOL is a solubilizing component selected from the group consisting of hydrocarbons, ethers, amines or mixtures thereof; and, A is selected from the group consisting of alkyl, dialkyl and cycloalkyl amine radicals having the general formula

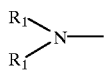

and cyclic amines having the general formula

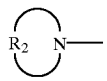

where $R_1$ and $R_2$ are as defined hereinabove.

A method of forming a functionalized polymer, according to the invention, comprises the steps of forming a solution of one or more anionically polymerizable monomers in an alkane solvent; and, polymerizing the monomers in the presence of an initiator which is soluble in the alkane solvent. The initiator comprises a solubilized lithio amine having the general formula

(A)Li(SOL)$_y$ where y is from about 1 to about 3; SOL is a solubilizing component selected from the group consisting of hydrocarbons, ethers, amines or mixtures thereof; and, A is selected from the group consisting of alkyl, dialkyl and cycloalkyl amine radicals having the general formula

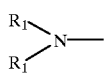

and cyclic amines having the general formula

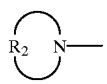

where $R_1$ and $R_2$ are as defined hereinabove.

A vulcanizable elastomeric compound having reduced hysteresis properties comprises an elastomeric polymer having chains carrying at least one functional group A, wherein A is derived from a polymerization initiator having the general formula

(A)Li(SOL)$_y$ where y is of from about 1 to about 3; SOL is a solubilizing component selected from the group consisting of hydrocarbons, ethers, amines or mixtures thereof; and, A is selected from the group consisting of alkyl, dialkyl and cycloalkyl amine radicals having the general formula

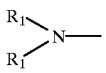

and cyclic amines having the general formula

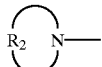

where $R_1$ and $R_2$ are as defined hereinabove; and from about 5 to 80 parts by weight of carbon black, per 100 parts of the polymer.

The present invention also provides a tire having decreased rolling resistance resulting from a treadstock containing a vulcanizable elastomeric composition which comprises an elastomeric polymer having chains carrying at least one functional group A wherein A is derived from a polymerization initiator having the general formula $$(A)Li(SOL)_y$$

where y is of from about 1 to about 3; SOL is a solubilizing component selected from the group consisting of hydrocarbons, ethers, amines or mixtures thereof; and, A is selected from the group consisting of alkyl, dialkyl and cycloalkyl amine radicals having the general formula

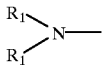

and cyclic amines having the general formula

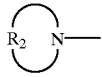

where $R_1$ and $R_2$ are as defined hereinabove; and from about 5 to 80 parts by weight of carbon black, per 100 parts by weight of said polymer.

A vulcanizable rubber composition comprises a polymer carrying at least one amine functional group A, wherein A is derived from the reaction product of an organolithium compound and an amine; and a tin-carbon bond.

A multifunctional polymer comprises at least one functional group A, wherein A is derived from the reaction product of an organolithium compound and an amine; and, a tin-carbon bond.

A vulcanizable rubber composition comprises a polymer carrying at least one amine functional group A, wherein A is derived from the reaction product of an organolithium compound and an amine; and a second functional group selected and derived from the group consisting of terminating agents, coupling agents and linking agents.

A tire having at least one vulcanizable elastomeric component comprises a multifunctional polymer having at least one functional group A, wherein A is derived from a polymerization initiator which is the reaction product of an organolithium compound and an amine, wherein the multifunctional polymer has a tin-carbon bond, and from about 5 to 80 parts by weight of carbon black, per 100 parts of the polymer.

A multifunctional polymer comprises at least one functional group A, wherein A is derived from the reaction product of an organolithium compound and an amine; and a second functional group selected and derived from the group consisting of terminating agents, coupling agents and linking agents.

A tire having at least one vulcanizable elastomeric component is also provided, which component comprises a multifunctional polymer having at least one functional group A, wherein A is derived from a polymerization initiator which is the reaction product of an organolithium compound and an amine; the polymer having a second functional group selected and derived from the group consisting of terminating agents, coupling agents and linking agents; and from about 5 to 80 parts by weight of carbon black, per 100 parts of said polymer.

A functionalized polymer according to the invention comprises a polymer chain carrying at least one functional group selected from the group consisting of alkyl, dialkyl and cycloalkyl amine radicals having the general formula

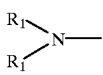

and cyclic amine radicals having the general formula

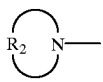

where $R_1$ and $R_2$ are as defined hereinabove.

A functionalized polymer according to the invention also comprises a polymer chain having the general formula AYLi; wherein A is a functional group selected from the group consisting of alkyl, dialkyl and cycloalkyl amine radicals having the general formula

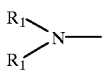

and cyclic amine radicals having the general formula

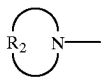

where $R_1$ and $R_2$ are as defined hereinabove; and wherein Y is a divalent polymer radical selected from the group consisting of diene homopolymer radicals, monovinyl aromatic polymer radicals, diene/monovinyl aromatic random copolymer and block copolymer radicals.

PREFERRED EMBODIMENT FOR CARRYING OUT THE INVENTION

As will become apparent from the description which follows, the present invention provides novel polymerization initiators which are soluble in acyclic alkanes, including normal alkanes such as hexane, pentane, heptane, isoheptane, octane, their alkylated derivatives, mixtures thereof, and the like. It has also been discovered herein that certain rubber compositions, vulcanizable elastomeric compositions and articles thereof based upon polymers formed using such initiators, exhibit useful properties, such as for example, reproducible relatively narrow molecular weight ranges. Furthermore, the polymers according to the invention also contain a functionality from the initiator, which functionality is useful for example, in reducing hysteresis properties.

While the initiators of the present invention are soluble in acyclic alkane solvents, it will be appreciated that the use of the initiators in other solvents is also within the scope of the invention.

The preferred initiator according to the invention, is the reaction product of an amine, an organo lithium and a solubilizing component. The organo lithium and the amine may be reacted in the presence of the solubilizing component or agent, or they may be reacted first and the reaction product thereof subsequently treated with the solubilizing component. The preferred initiator is therefore, a solubilized lithio amine having the general formula

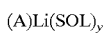

(A)Li(SOL)$_y$ where y is from about 1 to about 3. The parentheses of this general formula connote that the formula may include A-Li-SOL$_y$; SOL$_y$-A-Li; or, A-SOL$_y$-Li.

(SOL) is a solubilizing component and may be a hydrocarbon, ether, amine or a mixture thereof. It has been discovered that by the presence of the (SOL) component, the initiator is soluble in acyclic alkanes.

Exemplary (SOL) groups include dienyl or vinyl aromatic polymers or copolymers having from 3 to about 300 polymerization units. Such polymers include polybutadiene, polystyrene, polyisoprene and copolymers thereof. Other examples of (SOL) include polar ligands, such as tetrahydrofuran (THF) and tetramethylethylenediamine (TMEDA).

The (A) component represents the amine functionality, at least one of which is carried by the resulting polymer, such as by being incorporated at the initiation site or head thereof. For example, (A) may be a dialkyl or dicycloalkyl amine radical having the general formula

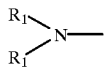

or a cyclic amine radical having the general formula

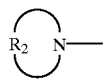

In these formulas, R$_1$ is an alkyl, cycloalkyl or aralkyl having from 1 to about 20 carbon atoms, where both R$_1$ groups may be the same or different, and R$_2$ is an alkylene, substituted alkylene, oxy- or N-alkylamino-alkylene group having from about 3 to about 16 methylene groups. The amino-alkylene group can be an N-alkylamino alkylene. By "substituted alkylene" it is understood that the alkylene has a substituent thereon. Preferred substituted alkylenes include mono- to octa-substituted alkylenes. The preferred substituents are linear or branched alkyls, cycloalkyls, bicycloalkyls, aryls and aralkyls having from 1 to about 12 carbon atoms.

Exemplary R$_1$ groups include methyl, ethyl, butyl, octyl, cyclohexyl, 3-phenyl-1-propyl, isobutyl and the like. Exemplary R$_2$ groups include tetramethylene, hexamethylene, oxydiethylene, N-alkylazadiethylene, dodecamethylene, hexadecamethylene and the like.

For example, (A) may be derivative or radical of pyrrolidine; piperidine; monoalkyl-piperazine; perhydroazepine such as 3,3,5-trimethylhexahydoazepine and hexamethyleneimine; 1-azacyclooctane; azacyclotridecane, also known as dodecamethyleneimine; azacycloheptadecane, also known as hexadecamethyleneimine; 1-azacycloheptadec-9-ene; or, 1-azacycloheptadec-8-ene; including bicyclics such as perhydroisoquinoline, perhydroindole, 1,3,3-trimethyl-6-azabicyclo [3.2.1] octane and the like. Pyrrolidine, perhydroazepine, 1-azacyclooctane and azacyclotridecane are preferred. A preferred pyrrolidine derivative is perhydroindole and a preferred piperidine is perhydroisoquinoline.

There are many useful examples of the alkyl, cycloalkyl, aryl and aralkyl substituents of the cyclic and bicyclic amines of the invention, including, but not limited to 2-(2-ethylhexyl)pyrrolidine; 3-(2-propyl)pyrrolidine; 3,5-bis(2-ethylhexyl) piperidine; 4-phenylpiperidine; 7-decyl-1-azacyclotridecane; 3,3-dimethyl-1-azacyclotetradecane; 4-dodecyl-1-azacyclooctane; 4-(2-phenylbutyl)-1-azacyclooctane; 3-ethyl-5-cyclohexyl-1-azacycloheptane; 4-hexyl-1-azacycloheptane; 9-isoamyl-1-azacycloheptadecane; 2-methyl-1-azacycloheptadec-9-ene; 3-isobutyl-1-azacyclododecane; 2-methyl-7-t-butyl-1-azacyclododecane; 5-nonyl-1-azacyclodecane; 8(4'-methylphenyl)-5-pentyl-3-azabicyclo[5.4.0]undecane; 1-butyl-6-azabicyclo[3.2.1]octane; 8-ethyl-3-azabicyclo[3.2.1.]octane; 1-propyl-3-azabicyclo[3.2.2]nonane; 3-t-butyl)-7-azabicyclo[4.3.0]nonane; 1,5,5-trimethyl-3-azabicyclo[4.4.0]decane; and the like.

It has been found that when R$_1$ and R$_2$ are each branched in the alkyl position, such as di-t-butyl, diisopropyl, tertiary butyl or the like, the resulting polymerizations are slow, presumably due to hinderance around the nitrogen at the initiation site. Hence, in a preferred embodiment of the invention, the carbon atoms in R$_1$ and R$_2$ which are bonded to the nitrogen in the amine, are also bonded to a total of at least three hydrogen atoms.

The initiator according to the present invention can be formed by preparing a solution of the amine component (A), in an anhydrous, aprotic solvent, such as hexane, preferably in the presence of the solubilizing agent or component (SOL), if (SOL) is an ether or an amino compound. To this solution is then added an organolithium catalyst in the same or a similar solvent. The organolithium compound has the general formula RLi where R is selected from the group consisting of alkyls, cycloalkyls, alkenyls, aryls and aralkyls having from 1 to about 20 carbon atoms and short chain length low molecular weight polymers from diolefin and vinyl aryl monomers having up to about 25 units. Typical alkyls include n-butyl, s-butyl, methyl, ethyl, isopropyl and the like. The cycloalkyls include cyclohexyl, menthyl and the like. The alkenyls include allyl, vinyl and the like. The aryl and aralkyl groups include phenyl, benzyl, oligo(styryl)

and the like. Exemplary short chain length polymers include the oligo(butadienyls), oligo(isoprenyls), oligo(styryls) and the like.

If (SOL) is a short chain length polymer, the monomers used to form (SOL) are added after the amine and the organolithium are mixed, as will be addressed hereinbelow. The initiator can also be formed by mixing the organolithium and the amine in the presence of the monomer.

To the solution of the amine and the organolithium, is added a solution of the monomers of the solubilizing component (SOL) in the same or similar solvent, if (SOL) is a polydiene or a polyvinyl aromatic. The three components are allowed to react for up to about one hour at ambient temperature (25° to 30° C.), or elevated temperatures up to about 100° C. preferably at less than 50° C., and more preferably at less than 38° C., following which the catalyst is ready for use. The initiators according to the present invention are considered to be soluble if they remain in solution within an excess of an acyclic alkane solvent for about 3 or more days.

As stated above, the initiator thus formed may be employed as an initiator to prepare any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers and copolymers thereof with monovinyl aromatic polymers. Suitable monomers include conjugated dienes having from about 4 to about 12 carbon atoms and monovinyl aromatic monomers having 8 to 18 carbon atoms and trienes. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, alpha-methylstyrene, p-methylstyrene, vinyltoluene and vinylnaphthalene. The conjugated diene monomer and aromatic vinyl monomer are normally used at the weight ratios of 95–50:5–50, preferably 95–65:5–35.

Polymerization is conducted in an acyclic alkane solvent, such as the various hexanes, heptanes, octanes, mixtures thereof, and the like. In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed.

Compounds useful as polar coordinators are organic and include tetrahydrofuran (THF), linear and cyclic oligomeric oxolanyl alkanes such as 2-2'-di(tetrahydrofuryl) propane, di-piperidyl ethane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, owned by the Assignee of record, the subject matter of which is incorporated herein by reference. Compounds useful as polar coordinators include those having an oxygen or nitrogen hetero-atom and a non-bonded pair of electrons. Other examples include dialkyl ethers of mono and oligo alkylene glycols; "crown" ethers; tertiary amines such as tetramethylethylene diamine (TMEDA); linear THF oligomers and the like.

A batch polymerization is usually begun by charging a blend of monomer(s) and an acyclic alkane solvent to a suitable reaction vessel, followed by the addition of the polar coordinator (if employed) and the initiator compound previously described. The reactants are heated to a temperature of from about 20 to about 200° C., and the polymerization is allowed to proceed for from about 0.1 to about 24 hours. A functional amine group is derived from the initiator compound and attaches at the initiation site. Thus, substantially every resulting polymer chain, or the predominance of the chains, has the following general formula AYLi where A is as described above, and Y is a divalent polymer radical which is derived from any of the foregoing diene homopolymers, monovinyl aromatic polymers, diene/monovinyl aromatic random copolymers and block copolymers. The monomer addition at the lithium end causes the molecular weight of the polymer to increase as the polymerization continues.

To terminate the polymerization, and thus further control polymer molecular weight, a terminating agent, coupling agent or linking agent may be employed, all of these agents being collectively referred to herein as "terminating agents". Certain of these agents may provide the resulting polymer with a multifunctionality. That is, the polymers initiated according to the present invention, may carry at least one amine functional group A as discussed hereinabove, and may also carry a second functional group selected and derived from the group consisting of terminating agents, coupling agents and linking agents.

Useful terminating, coupling or linking agents include active hydrogen compounds such as water or alcohol; carbon dioxide; N,N,N',N'-tetradialkyldiamino-benzophenone (such as tetramethyldiaminobenzophenone or the like); N,N-dialkylamino-benzaldehyde (such as dimethylaminobenzaldehyde or the like); 1,3-dialkyl-2-imidazolidinones (such as 1,3-dimethyl-2-imidazolidinone or the like); 1-alkyl substituted pyrrolidinones; 1-aryl substituted pyrrolidinones; dialkyl- and dicycloalkyl-carbodiimides having from about 5 to about 20 carbon atoms; $(R_3)_a ZX_b$;

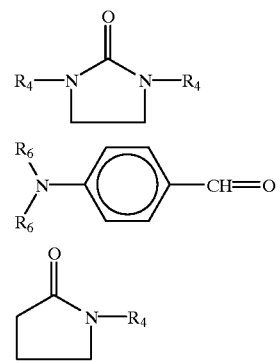

-continued

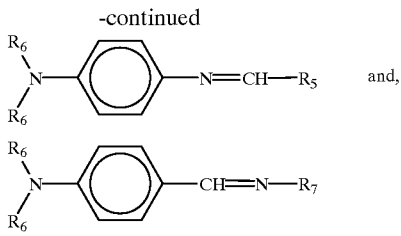

where Z is tin or silicon. It is preferred that Z is tin.

$R_3$ is an alkyl having from about 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_3$ may include methyl, ethyl, n-butyl, neophyl, phenyl, cyclohexyl or the like.

X is chlorine or bromine, "a" is from 0 to 3, and "b" is from about 1 to 4, where a+b=4.

Each $R_4$ is the same or different and is an alkyl, cycloalkyl or aryl, having from about 1 to about 12 carbon atoms. For example, $R_4$ may include methyl, ethyl, nonyl, t-butyl, phenyl or the like.

$R_5$ is an alkyl, phenyl, alkylphenyl or N,N-dialkylaminophenyl, having from about 1 to about 20 carbon atoms. For example, $R_5$ may include t-butyl, 2-methyl-4-pentene-2-yl, phenyl, p-tolyl, p-butylphenyl, p-dodecylphenyl, p-diethylaminophenyl, p-(pyrrolidino) phenyl, and the like.

Each $R_6$ is the same or different, and is an alkyl or cycloalkyl having from about 1 to about 12 carbon atoms. Two of the $R_6$ groups may together form a cyclic group. For example, $R_6$ may include methyl, ethyl, octyl, tetramethylene, pentamethylene, cyclohexyl or the like.

$R_7$ may include alkyls, phenyls, alkylphenyls or N,N-dialkylaminophenyls, having from about 1 to about 20 carbon atoms. For example, $R_7$ may include methyl, butyl, phenyl, p-butylphenyl, p-nonylphenyl, p-dimethylaminophenyl, p-diethylaminophenyl, p-(piperidino)phenyl, or the like.

Other examples of useful terminating agents include tin tetrachloride, $(R_1)_3SnCl$, $(R_1)_2SnCl_2$, $R_1SnCl_3$, carbodiimides, N-methylpyrrolidinone, cyclic amides, cyclic ureas, isocyanates, Schiff bases, 4,4'-bis (diethylamino) benzophenone, and the like, where $R_1$ is as described hereinabove.

One preferred polymer according to the present invention, is a polymer which includes at least one functional group A as discussed hereinabove, wherein A is derived from the reaction product of an amine and an organolithium compound as also discussed hereinabove. Furthermore, a preferred polymer is multifunctional wherein the polymer also carries a tin-carbon bond, such as may be derived from the terminating, coupling or linking agent. A rubber composition or a vulcanizable rubber composition according to the present invention, may include such a polymer.

The terminating, coupling or linking agent is added to the reaction vessel, and the vessel is agitated for about 1 to about 1000 minutes. As a result, an elastomer is produced having an even greater affinity for compounding materials such as carbon black, and hence, even further reduced hysteresis. Additional examples of terminating agents include those found in U.S. Pat. No. 4,616,069 which is herein incorporated by reference.

The polymer may be separated from the solvent by conventional techniques. These include steam or alcohol coagulation, thermal desolventization, or any other suitable method. Additionally, solvent may be removed from the resulting polymer by drum drying, extruder drying, vacuum drying or the like.

The elastomers of the present invention comprise a plurality of polymers, having a functional group at both the head and tail of the resulting polymer. Such compounding may result in products exhibiting reduced hysteresis, which means a product having increased rebound, decreased rolling resistance and has less heat build-up when subjected to mechanical stress.

It has also been found, as will be exemplified hereinbelow, that polymers formed using the initiators of the invention, are reproducibly formable in a relatively narrow range of molecular weights, such that substantially consistently reproducible polymers are possible with a molecular weight range of about 20,000 to about 250,000.

The polymers of the present invention can be used alone or in combination with other elastomers to prepare a product such as a tire treadstock, sidewall stock or other tire component stock compound. Such stocks are useful for forming tire components such as treads, subtreads, black sidewalls, body ply skims, bead fillers and the like. At least one such component stock is produced from a vulcanizable elastomeric or rubber composition. For example, the polymers according to the invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely such as between 10 and 99 percent by weight.

The polymers can be compounded with carbon black in amounts ranging from about 5 to about 100 parts by weight, per 100 parts of rubber (phr), with about 5 to about 80 parts being preferred and from about 40 to about 70 phr being more preferred. The carbon blacks may include any of the commonly available, commercially-produced carbon blacks but those having a surface area (EMSA) of at least 20 m²/g and more preferably at least 35 m²/g up to 200 m²/g or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following TABLE I.

TABLE I

CARBON BLACKS

| ASTM Designation (D-1765-82a) | Surface Area ($m^2/g$) (D-3765) |
|---|---|
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred. The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley interscience, N.Y. 1982, Vol. 20, pp. 365–468, particularly "Vulcanization Agents and Auxiliary Materials" pp. 390–402. Vulcanizing agents may be used alone or in combination.

Vulcanizable elastomeric or rubber compositions of the invention can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

GENERAL EXPERIMENTAL

In order to demonstrate the preparation and properties of the initiators and elastomers according to the present invention, a number of such initiators and elastomers were prepared. A solution of styrene and butadiene monomers in hexane was prepared and was polymerized with the above described initiators. To further show the effectiveness of the invention, a number of similar monomer solutions were polymerized with a heterogenous mixture of non-solubilized lithium pyrrolidide as an initiator to provide comparative control examples. The non-solubilized lithium pyrrolidides will be discussed first hereinbelow, followed by examples of initiators and elastomers made according to the present invention. As noted above, various techniques known in the art for carrying out polymerizations may be employed without departing from the scope of the present invention.

I. Non-Solubilized Lithium Pyrrolidide Initiation

The following examples are included for comparison to the initiators and elastomers prepared according to the invention, which will be exemplified hereinbelow.

Experiment No. 1

Initiator Preparation

In a small dried and nitrogen purged bottle, 20 ml of a 0.5 M solution of pyrrolidine in hexanes (10 milliequivalent or "meq") was treated with 6.36 ml of a 1.65 M solution of n-butyllithium in hexanes (10.5 meq). The bottle was fitted with a perforated crown seal having a rubber liner. The resulting heterogeneous mixture was agitated gently at room temperature for 16 hours, after which the product was drawn off for use as an initiator. The mixture was shaken vigorously before and while drawing off the samples.

Polymerization

The initiator mixture made in the above manner was transferred by syringe to each of two small bottles which were also fitted with a seal as above. The bottles each contained a 75/25 weight percent monomer blend of butadiene/styrene, at 25 weight percent in hexane and a level of 1.0 meq Li/100 grams of monomer. The bottles also contained 0.6 mol of N,N,N',N'-tetramethylethylenediamine (TMEDA) per mol of lithium. The mixtures were agitated at 50° C. for 2.5 hours. The reaction resulted in approximately 100 percent conversion of monomer to polymer.

The first bottle of cement, EXAMPLE 1, was then quenched by injection of 1.5 milliliters (ml) of isopropyl alcohol (i-PrOH), and the second bottle of cement, EXAMPLE 2, was treated for an additional 90 minutes at 50° C. with 1.15 mol of 4-(N,N-diethylamino) benzaldehyde per mol of lithium. The cement of EXAMPLE 2 was then quenched with 1.5 ml of i-PrOH.

Both cements from EXAMPLE 1 and EXAMPLE 2 were treated with an antioxidant, namely, 2 ml of a mixture containing 2.0 weight percent of dibutyl paracresol (DBPC) and 0.7 weight percent of UOP-88, available from Universal Oil Products Co., in hexane. The cements were then coagulated in i-PrOH and drum dried. The resulting polymers were analyzed, and the characteristics thereof are reported in TABLE II hereinbelow.

TABLE II

ANALYSIS OF POLYMERS FROM EXAMPLES 1 AND 2

| HNMR | Example 1<br>24% styrene<br>(0% block styrene) | Example 2<br>24.8% styrene<br>(0% block styrene) |
|---|---|---|
| Percent of butadiene portion as 1,2 linkages | 51.9% | 49.4% |
| GPC (THF solvent) | | |
| Mn | 136365 | 136697 |
| Mw/Mn | 1.35 | 1.40 |
| $Tg^a$ | −36.5° C. | −38.8° C. |

[a]glass transition temperature at onset

The polymers of EXAMPLES 1 and 2 were compounded using the rubber recipe reported in TABLE III hereinbelow.

TABLE III

COMPOUNDING RECIPE

| Ingredient | Mix Order | Parts per Hundred Parts Rubber | |
|---|---|---|---|
| Polymer | 1 | 100 | Masterbatch |
| Naphthenic oil | 2 | 10 | 145–155° C., 60 RPM |
| Carbon black, N-351 | 3 | 55 | |
| ZnO | 4 | 3 | |
| Antioxidant | 5 | 1 | |
| Wax blend | 6 | 2 | |
| Total Masterbatch: | | 171 | |
| Stearic acid | | 2 | Final |
| Sulfur | | 1.5 | 77–93° C., 40 RPM |
| Accelerator | | 1 | |
| Total Final: | | 175.5 | |

The compounded polymers were then cured using 1.5 inch×4 inch×0.040 inch tensile plaques, for 45 minutes at 300° F. (149° C.); Dynastat buttons, 50 minutes at 300° F. (149° C.). The results of ensuing physical tests are reported in TABLE IV.

TABLE IV

PHYSICAL TESTS OF COMPOUNDED POLYMERS OF EXAMPLES 1 AND 2

| Example No. | ML/4/212 (gum) | ML/4/212 (cpd) | Wt % Bound Rubber | 1 Hz Dynastat tan δ 50° C. | Ring Stress-Stain, psi, RT M300 | T.S. | % Eb |
|---|---|---|---|---|---|---|---|
| 1 | 32 | 81 | 28 | 0.110 | 2169 | 2836 | 419 |
| 2 | 33 | 84 | ca.29 | 0.107 | 2177 | 2327 | 359 |

The test results reported in TABLE IV, show that the compounded polymer of EXAMPLE 1 has a tan δ value about 30 percent below the value expected for an unmodified polymer of this molecular weight, prepared using a typical alkyllithium initiator. However, the polymer of EXAMPLE 2 fails to show any significant reduction in tan δ beyond this, despite its having been additionally treated at the tail with a reagent which is known to be effective for reducing tan δ. The lack of additional effect was also noted in the bound rubber results, where the result for EXAMPLE 2 was not significantly different from that of EXAMPLE 1.

It was concluded that the polymer cement prepared in this manner, besides having somewhat broadened molecular weight distribution, also did not have sufficient live C—Li chain ends after polymerization to allow for significant reaction with a chain-end functionalizing reagent. Therefore, this method was not highly desirable for synthesis of polymers with optimum properties.

Experiment No. 2

Initiator Preparation

A second non-solubilized initiator was prepared. In a clean, stirred, one gallon stainless steel reactor, which had been dried and preconditioned, and then nitrogen purged, was placed 1.22 pounds of anhydrous hexanes, and 5.4 ml of a 0.77 M solution of pyrrolidine in hexanes (4.16 meq). This was treated with 2.69 ml of a 1.58 M solution of n-butyllithium in hexanes (4.25 meq), stirring at room temperature overnight. The resulting heterogeneous mixture was used in situ for the subsequent polymerization.

Polymerization

The reactor containing the above initiator mixture was charged with 0.76 pounds of a 34 weight percent blend of styrene and hexanes, 1.28 mmol of TMEDA, and 3.06 pounds of a 25.5 weight percent blend of 1,3-butadiene in hexanes. The reactor was heated to 46° C. and controlled at that temperature for three hours.

A portion of the polymer cement made in this manner was transferred by needle into three small bottles sealed as in Experiment 1 hereinabove. The remainder of the cement was collected in a large glass container, under a nitrogen purge. The cement in the large container, EXAMPLE 3 was quenched by injection with 1.5 ml of isopropyl alcohol (i-PrOH), while the cement in the small bottles, EXAMPLE 4 was treated for an additional 2 hours at 50° C. with 1.25 mol of 1,3-dimethylimidazolidin-2-one (1,3-DMI) per mol of lithium. The cement of EXAMPLE 4 was then quenched with 1.5 ml of i-PrOH, and both cement portions were treated with an antioxidant (2 ml of a mixture containing 2.0 wt. percent DBPC in hexane). The contents of the bottles were combined, and both EXAMPLES 3 and 4 were coagulated separately in i-PrOH and drum dried. Suitable characterizations were performed, and the results are summarized in TABLE V hereinbelow.

Experiment No. 3

Repeat experiments were run using the same reactor as in Experiment No. 2, employing the same amount of reagents, reaction times, and temperatures from those of EXAMPLES 3 and 4. The resulting cement was compounded in the recipe of TABLE III hereinabove, and is reported as EXAMPLE 5 hereinbelow. A portion of EXAMPLE 5 was end-linked by reaction with one equivalent of $SnCl_4$ per equivalent of lithium, to produce EXAMPLE 6. A cement was also prepared as for EXAMPLE 5, except that the initiator was allowed to form in the reactor for three (3) days instead of overnight. Also, the resulting polymer was compounded in the recipe of TABLE VI hereinabove, and is reported herein as EXAMPLE 7. A portion of EXAMPLE 7 was treated with 1.25 mole of 4-(N,N-dimethylamino)benzylidene butylaniline per mole of lithium to produce EXAMPLE 8. The order of addition of polymerization reagents for the run producing EXAMPLE 7 and 8 were as follows: (1) TMEDA, (2) butadiene blend, (3) styrene blend. The polymeric products were worked up as described for EXAMPLES 3 and 4. Results of their characterization and compounded evaluation are given in TABLE V hereinbelow.

The product polymers were cured using 1.5 inch×4 inch× 0.040 tensile plaques, for 20 minutes at 165° C.; and Dynastat buttons, for 25 minutes and 165° C. TABLE V hereinbelow lists the characterizations and compounded properties of Examples 5 to 8.

TABLE V

SUMMARY OF CHARACTERIZATION AND COMPOUNDED PHYSICAL PROPERTIES OF EXAMPLES 3–8

| Example No. | 5 | 6 | 3 | 4 | 7 | 8 | 3,4,7,8 Control[a] |
|---|---|---|---|---|---|---|---|
| NMR | | | | | | | |
| % VINYL[b] | 52.9 | 52.9 | 70.0 | 70.0 | 63.6 | 63.6 | ca.40 |
| % STY | 22.4 | 22.4 | 22.0 | 22.0 | 26.6 | 26.6 | ca.20 |
| DSC $T_g$, °C.[c] | −42 | −42 | −24 | −24 | −24 | −24 | ca.−40 |
| GPC (THF) | | | | | | | |
| $M_n \times 10^{-3}$ | 95.8 | 221 | 254 | 228 | 201 | 197 | ca.200 |
| $M_w/M_n$ | 1.1 | 2.2 | 2.5 | 23 | 1.4 | 1.2 | ca.2–4 |
| Coupling | — | 78% | — | — | — | — | — |
| ML/4/100° C. | | | | | | | |
| Raw | 8 | 67 | 108 | 109 | 77 | 72 | ca.140 |
| Compound | 34 | 71 | 94 | 101 | 72 | 75 | 74 |
| Test Recipe, TABLE NO. | III | III | VI | VI | VI | VI | VI |
| STRESS M300[d] | 2116 | 2780 | 1361 | 1547 | 1520 | 1556 | 1276 |
| -STRAIN, TB[e] | 3115 | 2728 | 2373 | 2667 | 2649 | 2631 | 3551 |
| 23° C. % EB[f] | 455 | 344 | 503 | 497 | 507 | 491 | 653 |
| % BOUND RUBBER[g] | 21 | 37 | 34 | 40 | 27 | 37 | 32 |
| DYNASTAT 1 HZ, | | | | | | | |
| tan δ 50° C. | 0.144 | 0.078 | 0.156 | 0.138 | 0.162 | 0.143 | 0.186 |
| tan δ 23° C. | 0.167 | 0.109 | 0.180 | 0.219 | 0.231 | 0.219 | 0.227 |

[a]Blend of unmodified SBR's run in comparison with EXAMPLES 3, 4, 7, 8 in formulation of TABLE VI
[b]Mol % of butadiene content as 1,2-linkages
[c]Onset of $T_g$
[d]Average ring stress-strain, 300% modulus, psi
[e]Average ring stress-strain, tensile modulus, psi
[f]Average percent elongation at break
[g]Weight percentage of rubber content in C-black filled compound found insoluble in toluene after 2 days at room temperature, with no agitation

TABLE VI

MEDIUM-OIL COMPOUNDING FORMULATION

| Ingredient | Mix Order | Parts per Hundred Parts Rubber | |
|---|---|---|---|
| Polymer | 1 | 100 | Masterbatch |
| Carbon black | 2 | 54 | 145°–185° C. |
| ZnO | 3 | 3 | 60 RPM |
| Stearic acid | 4 | 2 | |
| Antioxidant/Processing aids | 5 | 4.25 | |
| Aromatic oil | 6 | 27.6 | |
| Total Masterbatch: | | 190.85 | |
| Sulfur | | 2.25 | Final |
| Accelerator blend | | 2.15 | 77°–93° C. |
| Total Final: | | 195.25 | 40 RPM |

The results in TABLE V show the shortcomings of polymerization with N-lithiopyrrolidide initiators. Although the initiator/monomers charged in runs 3, 5 and 7 were the same (1.0 meq of lithium per 100 grams of monomer), the molecular weight of the products ranged from 96,000 to 254,000, which is evidence of the highly erratic initiator. The high molecular weight products are indicative of slow initiation relative to propagation, presumably due to the heterogenous nature of the system. EXAMPLE 5 exhibited a tan δ reduction at 50° C. about 31% lower than that of an unmodified polymer of similar microstructure and molecular weight. The result of end-linking of the live cement of EXAMPLE 5, via $SnCl_4$, leading to EXAMPLE 6 was a further reduction in tan δ, to about 40% of that of an unmodified polymer of the same base (uncoupled) molecular weight. The bound rubber content, which is indicative of the extent of interaction with carbon black, increased appreciably while the GPC showed that 78 percent of the polymer chains were end-linked, an indication that an appreciable fraction of "live" chain-ends were still available for linking.

EXAMPLES 3, 4 and 7, 8 resulted in polymers of such high molecular weight that they were not processable for formulation in the low oil recipe of TABLE III, but were formulated according to the recipe of TABLE VI, which contains 27 parts per 100 rubber of oil for better processing. The results of the evaluations in TABLE V indicate that these polymers show reduced tan δ, but the 13–16 percent reduction relative to the unmodified SBR elastomers is small compared to that demonstrated in the EXAMPLES 5 and 6. Little change in viscosity occurred upon attempting end-linking with $SnCl_4$, indicating that there was little active C—Li remaining at the chain ends after polymerization in these polymers. The $SnCl_4$-treated polymers (EXAMPLES 4 and 8) exhibited tan δ's which were about 75 percent of that of the unmodified samples.

In summary, the results of polymerizations which were initiated using N-lithiopyrrolidide as described hereinabove, were highly erratic, both with respect to the nature and composition of the product as well as to other characteristics thereof.

II. Polymerization with a Solubilized Initiator
Experiment No. 4
Initiator Preparation A dried, stainless steel one gallon reactor under a nitrogen atmosphere, was charged with 1.22 pounds of hexane, and then with 5.4 ml of 0.77 M pyrrolidine in hexane (4.16 meq) followed by 2.7 ml of 1.58 M n-butyllithium in hexane (4.27 meq). The mixture was stirred overnight at 90° F. (32° C.). The reactor was then charged with 90 grams of 25.4 weight percent 1,3-butadiene in a hexane solution (423 mmol of butadiene), and the mixture was heated at 110 to 120° F. (43 to 49° C.) for one hour. This effectively places a SOL group on the pyrrolidine moiety consisting on average of about 100 parts of 1,3-butadiene.

Polymerization

There was then charged to the reactor, 0.76 pounds of 33 weight percent styrene in hexane, containing 1.06 mmol of TMEDA, followed immediately by 2.89 pounds of the 25.4 weight percent butadiene/hexane blend. This provided for an initiator to monomer charged ratio of 1.0 meq of lithium per 100 grams of monomer (1.0 meq Li phgm). The polymerization was allowed to continue for 2 hours at 120° F. (49° C.) and the live cement was collected through a twelve gauge stainless steel needle into four small beverage bottles, fitted and purged as described in the preceding examples.

The cements in two of the bottles, EXAMPLE 9, were quenched by injection with 1.5 ml of i-PrOH, while the cements in the other two bottles, EXAMPLE 10, were treated for an additional two hours at 50° C. with 1.2 mol of tributyltin chloride per mol of lithium. The cement of EXAMPLE 10 was then quenched with 1.5 ml of i-PrOH, and both cement portions were treated with an anti-oxidant as in Experiment III hereinabove. Both EXAMPLES 9 and 10 were coagulated separately in i-PrOH and drum dried. Suitable characterizations were performed, and the results are summarized in TABLE VII hereinbelow.

Experiment No. 5

Initiator Preparation

A mixture of 25.1 meq of pyrrolidine and 25.1 meq of n-butyllithium in hexane was stirred under nitrogen over a weekend at room temperature. This was treated with 50.2 meq of THF in hexane, and the resulting mixture was used to initiate the polymerization.

Polymerization

A dried, stainless steel five gallon reactor under a nitrogen atmosphere, was charged with 8.53 pounds of hexane, 3.17 pounds of 33 weight percent styrene in hexane, 8.78 mmol of TMEDA, followed immediately by 17.89 pounds of a 25.4 weight percent butadiene/hexane blend, and the initiator prepared hereinabove, contained 25.1 meq of lithium. The polymerization was run for 2.25 hours at 110 to 120° F. (43 to 49° C.) and the live cement was collected through a twelve gauge stainless steel needle into five small beverage bottles, fitted and purged as described in the previous examples, and through a ½ inch pipe into two dried and purged large containers under a nitrogen purge.

The cements in the large containers, EXAMPLE 11, were quenched by injection with i-PrOH, while the cements in the bottles, EXAMPLE 12, were treated first for an additional 0.5 hours at 50° C. with 0.3 equivalents of tin tetrachloride per mol of lithium, followed by treatment for 2 hours at 50° C. with 0.84 mols of 1,3-dimethyl-2-imidazolidinone (1,3-DMI) per mol of lithium. The cement remaining in the reactor, EXAMPLE 13, was treated for about 2 hours at 50° C. with 0.8 equivalents of $SnCl_4$ per equivalent of lithium. The polymeric products were worked up as described for EXAMPLES 9 and 10 hereinabove. Results of their characterizations and compounded evaluations are given in TABLE VII hereinbelow.

Experiment No. 6

Initiator Preparation

A separate portion of the same initiator used in EXAMPLES 11, 12 and 13 was set aside and used two days later as follows, with an estimated concentration of 0.6 meq/ml.

Polymerization

The procedure used to polymerize the base cement of EXAMPLES 11–13 was repeated. The live product cement was collect through a twelve gauge stainless steel needle into five small beverage bottles, fitted and purged as described in the preceding examples and through a ½ inch pipe into two dried and purged large containers under a nitrogen purge.

The cements in the large containers in EXAMPLE 14, were quenched by injection with i-PrOH while the cements in the bottle, EXAMPLE 15, were treated first for an additional 0.5 hours at 50° C. with 0.3 equivalents of tin tetrachloride per mol of lithium, followed by treatment for 2 hours at 50° C. with 0.85 mol of 1,3-DMI per mol of lithium. The polymeric products were worked up as described for EXAMPLES 9 and 10, results of their characterizations and compounded evaluations are given in TABLE VII hereinbelow.

TABLE VII

SUMMARY OF CHARACTERIZATION AND COMPOUNDED PHYSICAL PROPERTIES OF EXAMPLES 9–15

| EXAMPLE NO. | 9 | 10 | 11 | 12 | 13 | 14 | 15 |
|---|---|---|---|---|---|---|---|
| NMR | | | | | | | |
| % VINYL[b] | 42.7 | 42.7 | 53.3 | 53.3 | 53.3 | 50.1 | 50.1 |
| % STY | 19.4 | 19.4 | 20.6 | 20.6 | 20.6 | 20.6 | 20.6 |
| DSC $T_g$, °C.[c] | −45 | −45 | −38 | −38 | −38 | −43 | −43 |
| GPC (THF) | | | | | | | |
| $M_n \times 10^{-5}$ | 1.45 | 1.44 | 1.30 | 2.42 | 2.45 | 1.13 | 2.09 |
| $M_w/M_n$ | 1.15 | 1.17 | 1.14 | 1.79 | 2.09 | 1.15 | 1.94 |
| Coupling | — | — | — | 53% | 64% | — | 54% |
| ML/4/100° C. | | | | | | | |
| Raw | 24 | 24 | 29 | 78 | 94 | 19 | 76 |
| Compound | 70 | 90 | 82 | 103 | 114 | 76 | 107 |
| Test Recipe, TABLE NO. | III | III | III | III | III | III | III |
| STRESS-STRAIN M300[c] | 2125 | 2514 | 2177 | 2374 | 2903 | 2903 | 2706 |
| STRESS-STRAIN, TB[d] | 2832 | 3275 | 2982 | 2956 | 3445 | 3418 | 3451 |
| 23° C. % EB[e] | 419 | 409 | 431 | 403 | 387 | 395 | 409 |
| % BOUND RUBBER[f] | 28.4 | 49.5 | 31.3 | 42.0 | 42.3 | —[g] | —[g] |
| DYNASTAT 1 HZ, | | | | | | | |
| tan δ +50° C. | 0.079 | 0.056 | 0.080 | 0.076 | 0.078 | 0.129 | 0.103 |
| tan δ −20° C. | 0.374 | 0.389 | 0.675 | 0.684 | 0.431 | 0.541 | 0.563 |

[a]Mol % of butadiene content as 1,2-linkages
[b]Onset of $T_g$
[c]Average ring stress-strain, 300% modulus, psi
[d]Average ring stress-strain, tensile modulus, psi
[e]Average percent elongation at break
[f]Weight percentage of rubber content in C-black filled compound found insoluble in toluene after 2 days at room temperature, with no agitation
[g]Not tested Experiment No. 7

Initiator Preparation

A mixture of 28.6 meq of pyrrolidine, 57.2 mmol of THF, and 29.15 meq of n-butyllithium in hexane, was stirred under a nitrogen atmosphere overnight at room temperature. An aliquot from the resulting mixture (about 0.56 milliequivalent (meq) per ml) was used to initiate the polymerization.

A five gallon stainless steel reactor was then charged with 6.42 pounds of hexane, 28.6 mol equivalent of the above 0.56 M initiator, and 1.25 pounds of a 24.2 weight percent blend of butadiene and hexane, and the mixture was heated at 100° F. (35° C.) for one hour.

Polymerization

There was then charged to the reactor, 3.53 pounds of 34 weight percent styrene in hexane, 9.7 mmol of TMEDA, and 17.85 pounds of the butadiene/hexane blend. This provided for an initiator to monomer charge ratio of 1.05 meq Li phgm, and a monomer ratio of approximately 20 weight percent styrene/80 weight percent butadiene. The polymerization was run for 1.75 hours at 110 to 115° F. (43 to 46° C.). The reactor was finally charged with 0.3 pounds of the butadiene/hexane blend, and a 4.1 pound sample of the cement was immediately collected in a large container and quenched by adding i-PrOH, EXAMPLE 16. The contents remaining in the reactor were treated by stirring with 22.2 ml of 1.0 N $SnCl_4$ for 1.5 hours at 100 to 110° F. (43 to 46° C.), and the cement was dropped under a nitrogen purge into a five gallon canister containing a small amount of i-PrOH EXAMPLE 17.

The cements from EXAMPLES 16 and 17 were treated with an antioxidant as in the immediately preceding experiment, and both samples were coagulated in i-PrOH and drum dried. Suitable characterizations were performed and the results are summarized in TABLE VIII hereinbelow.

Experiment No. 8

Initiator Preparation

A mixture of 88.8 meq of pyrrolidine, 177.8 mmol of THF, and 89.8 meq of n-butyllithium in hexane was stirred under nitrogen overnight at room temperature. An aliquot from the resulting mixture (approximately 0.57 meq per ml) was used to initiate polymerization.

A five gallon stainless steel reactor was then charged with 6.55 pounds of hexane, 47.1 ml (26.7 meq) of the above 0.57 M initiator, and 1.0 pound of a 24.2 weight percent blend of butadiene in hexane, and the mixture was heated at 100° F. (38° C.) for 30 minutes.

Polymerization

There was then charged into the reactor, 4.41 pounds of 34 weight percent styrene in hexane, 9.08 mmol of TMEDA, and 17.1 pounds of the butadiene/hexane blend. This provided for an initiator to monomer charge ratio of 0.98 meq Li phgm, and a monomer ratio of approximately 25 weight percent styrene/75 weight percent butadiene. The polymerization was run 2.3 hours at 110 to 115° F. (43 to 46° C.). The reactor was finally charged with 0.5 pounds of the butadiene/hexane blend, and a 3.5 pound sample of the cement was immediately collected in a large container and quenched by adding i-PrOH, EXAMPLE 18. The contents remaining in the reactor were treated by stirring with 21.0 ml of 1.0 N SnCl$_4$ at 115° F. (46° C.). After reaction, the cement was dropped under a nitrogen purge into a five gallon canister containing a small amount of i-PrOH, EXAMPLE 19. The cements were treated with an antioxidant as in the immediately preceding example and both cements from EXAMPLES 18 and 19 were coagulated separately in i-PrOH and then drum dried. Suitable characterizations were performed and the results are summarized in TABLE VIII hereinbelow.

TABLE VIII

SUMMARY OF CHARACTERIZATION AND COMPOUNDED PHYSICAL PROPERTIES OF EXAMPLES 16–19

| Example No. | 16 | 17 | 18 | 19 |
|---|---|---|---|---|
| NMR | | | | |
| % VINYL[b] | 42.7 | 43.1 | 43.4 | 43.4 |
| % STY | 20.4 | 20.1 | 24.9 | 24.9 |
| DSC T$_g$, ° C.[c] | −47 | −46 | −45 | −45 |
| GPC (THF) | | | | |
| M$_n$ × 10$^{-5}$ | 1.00 | 2.41 | 1.22 | — |
| M$_w$/M$_n$ | 1.10 | 1.48 | 1.26 | — |
| Coupling | — | 86% | — | 69% |
| ML/4/100° C. | | | | |
| Raw | 7 | 82 | 20 | 113 |
| Compound | 47 | 94 | 61 | 98 |
| Test Recipe, TABLE NO. | III | III | III | III |
| STRESS-STRAIN M300[c] | 2165 | 2525 | 2643 | 2903 |
| STRESS-STRAIN, TB[d] | 3167 | 3452 | 3283 | 3714 |
| 23° C. % EB[e] | 447 | 423 | 405 | 409 |
| DYNASTAT 1 HZ, | | | | |
| tan δ +50° C. | 0.100 | 0.079 | 0.098 | 0.092 |
| tan δ −20° C. | 0.289 | 0.312 | 0.495 | 0.548 |

[a]Mol % of butadiene content as 1,2-linkages
[b]Onset of T$_g$
[c]Ring stress-strain, 300% modulus, psi
[d]Ring stress-strain, tensile modulus, psi
[e]% Elongation at break The product polymers were compounded and tested as indicated in the test recipes show in TABLE III, and cured as above. TABLE VII lists the characterizations and properties of the polymers from EXAMPLES 9–15. TABLE VIII lists the characterizations and compounded properties of EXAMPLES 16–19.

The results in TABLES VII and VIII show the advantages and the desirable results obtained from polymerization with the initiators according to the present invention. In contrast to the results in TABLE V, EXAMPLES 9–19 demonstrate the consistency of diene polymerizations employing these initiators. Namely, the polymerizations show relatively reproducible and predictable molecular weights, with narrow molecular weight distributions, and the polymer cements exhibit better viability of the living C—Li chains for further reactions. The dicapped polymers of EXAMPLES 10, 12, 13 and 17 show exceptionally low hysteresis, at about 40 percent to 50 percent of the values expected for comparable unmodified polymers of the same base molecular weight.

EXAMPLES 6, 10, 12, 13, 17 and 19 also exhibit the advantageous combination of N—Li initiation and end-linking or termination with a tin compound, such as R$_3$SnCl or SnCl$_4$.

The results of polymerizations which were initiated in acyclic alkane solvents using the lithium pyrrolidide as described in the comparative EXAMPLES 1–8, were highly erratic both with respect to the nature and composition of the products as well as their hysteresis behavior. However, when formulated as the N-lithiohydrocarbon amide with near-equivalent amounts of polar ligand or with monomer extension, as exemplified hereinabove, reproducible polymerizations with good molecular weight control, narrow molecular weight distributions, and good preservation of living C—Li ends for further reactions are achieved.

Experiment No. 9

Preparation of Polymer from C$_{12}$H$_{24}$NLi.2THF Initiator

Preparation of C$_{12}$H$_{24}$NLi.2THF initiator

Dodecamethyleneimine ("DDMI") was vacuum distilled from calcium hydride and transferred under nitrogen to a dried, nitrogen-purged bottle. The N-lithio salt of DDMI was prepared by treating 10 ml of a 0.4 M solution of DDMI in hexanes with 2 ml of a 4.0 M solution of THF in hexanes, followed by the slow addition of 2.35 ml of a 1.7M solution of n-butyllithium in hexanes, with gentle swirling. Swirling was continued at room temperature overnight. The resulting 0.28M solution was a clear, pale yellow. If the DDMI were treated by rapid addition of n-butyllithium, or in the absence of at least about 2 equivalents of the THF, cloudiness and/or precipitation occurred right away. The $C_{12}H_{24}NLi\cdot 2THF$ solution was stable for at least several days at room temperature. Samples were drawn from it by syringe for use in initiating polymerization.

Polymerization of Butadiene and Styrene with $C_{12}H_{24}NLi\cdot 2THF$ or n-BuLi A 0.28 M solution of the above initiator was added to sealed bottles containing an 80%/20% by weight blend of butadiene and styrene in hexanes, at a level of 1.0 meq Li/100 grams monomer, and N,N,N',N-tetramethylethylenediamine ("TMEDA") was added at 0.45 TMEDA/Li (mol/mol). The mixtures were agitated at 50° C. for 2.5 hr, proceeding to approximately 90–100% conversion to polymer. In practice, there is considerable leeway in the reaction times and temperatures, much the same as there is leeway in the reaction vessels, type of agitation, etc., used. The treated cements then were quenched by injection with 1 ml of i-PrOH, treated with an antioxidant (3 ml of a mixture containing 1.6 wt % DBPC in hexane), coagulated in i-PrOH, air-dried at room temperature, then drum-dried. Suitable characterizations were performed. Characterizations are summarized in Table IX. Table IX also contains data for polymers prepared with n-butyllithium in the same way, in the absence of DDMI or THF. These were prepared as a comparison, to show the type of hysteresis behavior obtained in the absence of the initiator compositions of this invention. The relative hysteresis behavior is typical of that of nonfunctional polymers.

Polymerization of Butadiene and Styrene, and End-linking with $SnCl_4$

The above procedure was followed exactly, except that after 1.5 hour of polymerization at 50° C., the polymerization mixture was treated with 0.8 equivalent of $SnCl_4$ per equivalent of Li charged. The products were worked up in the same manner as above, and the characterizations are also summarized in Table IX.

Evaluation of Compounded Properties

The product polymers were compounded and tested as indicated in the test recipe shown in Table I and cured 20 minutes at 165° C. Results of physical tests are summarized in Table X. In addition, the carbon-bound rubber content of the uncured, final compounded stocks of Examples 20 and 21 were 33 percent and 49 percent, respectively. This indicates an enhanced interaction between the polymer and carbon black in these cases, compared to unmodified rubber, which typically exhibits less than 23 percent carbon-bound rubber, and butyllithium-initiated, Sn-coupled rubber, which typically exhibits less than 35 percent carbon-bound rubber. The results of this test provided good evidence for reduced hysteresis in this polymer. The Dynastat tan δ (50° C.)= 0.091–0.094 is about 50 percent below the value expected for an unmodified polymer of this microstructure and molecular weight, such as would be prepared using a typical alkyllithium initiator.

TABLE IX

CHARACTERIZATIONS OF POLYMERS FROM $C_{12}H_{24}NLi\cdot 2THF$ INITIATORS

| Example No. | Conditions | $T_g$, ° C. | % Sty | % 1,2 | ML/4 | $M_n$ | $M_w/M_n$ | % Coupl |
|---|---|---|---|---|---|---|---|---|
| 20 | $C_{12}H_{24}NLi\cdot 2THF$ 50° C. | −31.4 | 20.9 | 56.2 | 26.2 | 127724 | 1.25 | (6% HMW) |
| 21 | $C_{12}H_{24}NLi\cdot 2THF$ 50° C. - $SnCl_4$-coupled | −34.4 | 21.0 | 53.7 | 86.1 | 215628 | 1.71 | 74 |
| 22 | n-BuLi only, 50° C. | −39.9 | 20.8 | 49.1 | 5.8 | 89631 | 1.17 | — |
| 23 | n-BuLi only, 50° C. $SnCl_4$-coupled | −38.2 | 20.6 | 50.2 | 65.9 | 217335 | 1.51 | 82 |

TABLE X

COMPOUNDED EVALUATIONS OF POLYMERS PREPARED USING $C_{12}H_{24}NLi\cdot 2THF$ INITIATOR

| Example No. | Tensile Strength, psi | % Elong. at break | ML/4-Cpd | Dispersion Index, % | % Bound Rubber | Dynastat, 1 Hz, tan δ, 50° C. |
|---|---|---|---|---|---|---|
| 20 | 3306 | 441 | 74 | 91 | 33.0 | 0.091 |
| 21 | 3673 | 426 | 104 | 92 | 48.9 | 0.094 |
| 22 | 2375 | 427 | 30 | 96 | 9.2 | 0.186 |
| 23 | 3024 | 449 | 66 | 97 | 12.6 | 0.120 |

Experiment No. 10

Preparation of Polymer from N-Lithio(3,3,5-trimethyl) Hexahydroazepine Initiator Elastomers containing head-bound (3,3,5-trimethyl) hexahydroazepine (THMI) were prepared using N-lithio(3,3,5-trimethyl) hexahydroazepine initiator. Samples with and without end-linking with $SnCl_4$ were prepared from the same living polymer in a manner similar to that described in the examples above. Characterizations and evaluations of the dynamic mechanical properties are summarized in TABLE XI below.

TABLE XI

CURED PROPERTIES OF SBR INITIATED WITH N-LITHIO (3,3,5-TRIMETHYL HEXAHYDROAZEPINE (LTHMI) INITIATOR (TEST RECIPE OF TABLE III)

| Polymer No. | Feature | DSC, Tg, °C. | $M_n$ | $M_w/M_n$ | Raw ML/4 | Dynastat, 1 Hz, 50° C., tan δ | Wt % Bound Rubber |
|---|---|---|---|---|---|---|---|
| — | Sn-coupled control | −38 | — | — | 75 | 0.103 | 33.6 |
| 24 | LTHMI-SBR-H | −38.7 | 102937 | 1.07 | 18.6 | 0.103 | 32.0 |
| 25 | (LTHMI-SBR)$_4$Sn | −38.7 | 191054 | 1.68 | 81.0 | 0.083 | 44.9 |

The data of TABLE XI show that the polymer of Example 24, initiated with the N—Li salt of the substituted cyclic amine, had the same level of hysteresis and about the same amount of bound rubber as a low-hysteresis control polymer that had been end-linked with SnCl$_4$. The polymer of Example 25 that combined initiation by the substituted cyclic amine and end-linking with SnCl$_4$ had a level of hysteresis about 20 percent lower than the control polymer with end-linking only. Furthermore, the levels of bound rubber that were measured for both of these N—Li amide-initiated examples indicated that there is a strong interaction between the polymers and the carbon black of the compounding recipe, especially in the polymer that combined amino-initiation and end-linking by Sn.

Experiment No. 11

A tire that was prepared with treadstock containing an elastomer as described in this invention exhibited a reduced level of rolling loss, compared to an identical tire prepared with a treadstock containing a conventional elastomer.

A preferred method of preparing the initiators according to the invention, will now be described. A vessel, such as a small bottle containing a Teflon or glass-clad magnetic stirring bar, is dried, sealed, and purged with nitrogen. The following is added by syringe while stirring:

1. 30 mmol anhydrous 20 amine in hydrocarbon solvent, and
2. 60 mmol anhydrous polar solubilizer in hydrocarbon solvent.
3. 30.1 mmol of alkyl lithium in hydrocarbon solvent is added by syringe at once, with stirring, while taking precaution for back-pressures (the larger ring amides may tend to precipitate if the alkyllithium is added too rapidly).

The solution will heat and develop pressure immediately, but will soon begin to cool back down. When larger amounts of reagent are prepared, e.g. 250–300 mmol in large bottles or 0.5–1.5 mol in reactors, best results are obtained when chilled or cold water cooling is used to keep the peak temperature at about 38° C. or below. The normal procedure has been to allow the mixture to stir overnight at room temperature before using. However, the reaction is essentially complete within minutes. The mixture should be clear, straw-yellow, without significant precipitation. Light-to-moderate haziness or cloudiness does not appear to affect activity. Anhydrous conditions are required. (SOL)/hydrocarbon solvent solutions with less than 30 ppm of water give best results. Initiator reagents can be stored under positive nitrogen pressures for periods of up to several weeks at room temperature (25–27° C.). N-Lithio pyrrolidine.2THF solutions prepared and stored in this manner at about 0.5M–1.5M in hexanes are stable for periods of about three to four weeks, and are effective initiators for diene and/or vinylaromatic (co)polymerizations, giving polymers with excellent properties. N-Lithio perhydroazepine.2THF solutions prepared and stored in this manner at about 0.3M–0.9M in hexanes are stable for at least several days, and can also be used with good results in polymerizations.

It should now be clear from the foregoing examples and specification disclosure, that initiators according to the present invention are useful for the anionic polymerization of diene monomers. Reproducible polymerization of such polymers within a relatively narrow molecular weight range is achieved, and the resulting polymers also exhibit good preservation of live C—Li ends, when compared to the non-solubilized initiators heretofore known in the art.

It is to be understood that the invention is not limited to the specific initiator reactants, monomers, terminators, polar coordinators or solvents disclosed herein, except as otherwise stated in the specification. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A functionalized polymer comprising:
    a polymer chain having at least one monomer unit selected from the group consisting of conjugated dienes having from about 4 to about 12 carbon atoms and monovinyl aromatic monomers having 8 to 18 carbon atoms and trienes and carrying at least one functional group selected from the group consisting of cyclic amine radicals having the formula

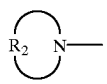

where $R_2$ is selected from the group consisting of an alkylene, substituted alkylene, oxy- or N-alkylaminoalkylene group having from about 3 to about 16 methylene groups, and the functional group is tethered to the polymer chain via the nitrogen atom;

wherein said functional group is derived from a polymerization initiator that is soluble in an acyclic alkane solvent.

2. A functionalized polymer as in claim 1, wherein said functional group is selected from the group consisting of radicals of pyrrolidine; piperidine; monoalkyl-piperazine; perhydroazepine, 1-azacyclooctane; azacyclotridecane; azacycloheptadecane; 1-azacycloheptadec-9-ene; and, 1-azacycloheptadec-8-ene.

3. A functionalized polymer as in claim 2, wherein said perhydroazepine is selected from the group consisting of 3,3,5-trimethylhexahydroazepine and hexamethyleneimine.

4. A functionalized polymer as in claim 1, wherein said functional group is bicyclic.

5. A functionalized polymer as in claim 4, wherein said bicyclic functional group is selected from the group consisting of perhydroisoquinoline, perhydroindole and 1,3,3-trimethyl-6-azabicyclo[3.2.1]octane.

6. A functionalized polymer as in claim 1, wherein said substituted alkylene is a mono- to octa-substituted alkylene.

7. A functionalized polymer as in claim 6, wherein the substituent of said substituted alkylene is linear or branched and has from 1 to about 12 carbon atoms.

8. A functionalized polymer as in claim 7, wherein said substituent is selected from the group consisting of alkyls, cycloalkyls, bicycloalkyls, aryls, and aralkyls.

9. A functionalized polymer, as set forth in claim 1, wherein said alkylene, substituted alkylene, oxy- and N-alkylamino-alkylene groups have from about 6 to about 16 methylene groups.

10. A functionalized polymer, as set forth in claim 1, wherein said polymerization initiator is the reaction product of an amine, an organolithium compound, and a solubilizing component.

11. A functionalized polymer, as set forth in claim 10, wherein said reaction product is defined by the formula (A)Li(SOL)$_y$

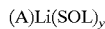

where y is from about 1 to about 3, Li is a lithium atom, and SOL is a solubilizing component, and A is a cyclic amine radical having the formula

where N is a nitrogen atom, and R$_2$ is selected from the group including alkylene, substituted alkylene, oxy- or N-alkylamino-alkylene groups, each having from about 3 to about 16 methylene groups.

12. A functionalized polymer, as set forth in claim 11, where SOL is a divalent hydrocarbon, ether, or amine or polar ligand.

13. A functionalized polymer, as set forth in claim 12, where said divalent hydrocarbon is selected from the group including dienyl polymers, vinyl aromatic polymers, dienyl copolymers, vinyl aromatic copolymers, and dienyl and vinyl aromatic copolymers, each having from about 3 to about 300 polymerization units.

14. A vulcanizable composition of matter comprising:

a rubber component including at least one functionalized polymer having at least one monomer unit selected from the group consisting of conjugated dienes having from about 4 to about 12 carbon atoms and monovinyl aromatic monomers having 8 to 18 carbon atoms and trienes, and from about 5 to about 100 parts by weight, per 100 parts by weight of said rubber, component of a reinforcing filler;

where said at least one functionalized polymer carries at least one functional group that derives from a polymerization initiator having the formula (A)Li(SOL)$_y$

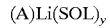

where Li is a lithium atom, SOL is a solubilizing component, and y is from about 1 to about 3, and A is a cyclic amine radical having the formula

where N is a nitrogen atom, R$_2$ is selected from the group including alkylene, substituted alkylene, oxy- or N-alkylamino-alkylene groups, each having from about 3 to about 16 methylene groups.

15. A vulcanizable composition of matter, as set forth in claim 14, where at least one of said functionalized polymers also carry a second functional group that includes a tin-carbon bond derived from a terminating, coupling or linking agent (R$_3$)$_a$ZX$_b$, where Z is tin; R$_3$ is selected from the group consisting of alkyls having from 1 to about 20 carbon atoms, cycloalkyls having from about 3 to about 20 carbon atoms, aryls having from 6 to about 20 carbon atoms and aralkyls having from about 7 to about 20 carbon atoms; X is chlorine or bromine; and, a is from 0 to 3 and b is from 1 to 4 where a+b=4.

16. A vulcanizate prepared by vulcanizing the vulcanizable composition of matter set forth in claim 14.

17. A vulcanizable composition of matter, as set forth in claim 14, where SOL is selected from the group consisting of a divalent hydrocarbon, ether, amine, or polar ligand.

18. A vulcanizable composition of matter, as set forth in claim 17, where said divalent hydrocarbon is selected from the group consisting of dienyl polymers, vinyl aromatic polymers, dienyl copolymers, vinyl aromatic copolymers, and dienyl and vinyl aromatic copolymers having from about 3 to about 300 polymerization units.

19. A vulcanizable composition of matter, as set forth in claim 14, where SOL is formed from a solubilizing agent selected from diene monomers, vinyl aromatic monomers, and mixtures thereof.

20. A vulcanizable rubber composition as in claim 14, wherein said functional group A is selected from the group consisting of radicals of pyrrolidine; piperidine; monoalkyl-piperazine; perhydroazepine, 1-azacyclooctane; azacyclotridecane; azacycloheptadecane; 1-azacycloheptadec-9-ene; and, 1-azacycloheptadec-8-ene.

21. A vulcanizable rubber composition as in claim 20, wherein said perhydroazepine is selected from the group consisting of 3,3,5-trimethylhexahydroazepine and hexamethyleneimine.

22. A vulcanizable rubber composition as in claim 14, wherein said functional group is bicyclic.

23. A vulcanizable rubber composition as in claim 22, wherein said bicyclic functional group is selected from the group consisting of perhydroisoquinoline, perhydroindole and 1,3,3-trimethyl-6-azabicyclo octane.

24. A vulcanizable rubber composition as in claim 14, wherein said substituted alkylene is a mono- to octa-substituted alkylene.

25. A vulcanizable rubber composition as in claim 24, wherein the substituent of said substituted alkylene is linear or branched and has from 1 to about 12 carbon atoms.

26. A vulcanizable rubber composition as in claim 25, wherein said substituent is selected from the group consisting of alkyls, cycloalkyls, bicycloalkyls, aryls, and aralkyls.

27. A tire component formed from the vulcanizable rubber composition of claim 14.

28. A functionalized polymer prepared by a process comprising the step of:
preparing a solution of a cyclic amine compound, an organolithium compound, and from 3 to about 300 equivalents, based upon one equivalent of lithium, of a monomer selected from the group consisting of conjugated dienes having from about 4 to about 12 carbon atoms, monovinyl aromatic monomers having 8 to 18 carbon atoms, trienes, and mixtures thereof, where said cyclic amine compound is defined by the formula

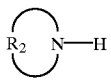

where $R_2$ is selected from the group consisting of an alkylene, substituted alkylene, oxy- or N-alkylamino-alkylene group having from about 3 to about 16 methylene groups, N is a nitrogen atom, and H is a hydrogen atom, thereby forming a polymerization initiator having the formula $(A)Li(SOL)_y$ where Li is a lithium atom, SOL is a divalent hydrocarbon group having from 3 to about 300 polymerized monomeric units, where y is from about 1 to about 3, and A is a cyclic amine radical derived from said cyclic amine;
charging the solution containing $(A)Li(SOL)_y$ with sufficient monomer to form a living polymeric structure; and
quenching the living polymeric structure.

29. A functionalized polymer, as set forth in claim 28, where said process further includes heating the solution containing $(A)Li(SOL)_y$ to a temperature of from about 20° C. to about 200° C.

30. A functionalized polymer, as set forth in claim 29, where a polar coordinator is also added to the solution containing $(A)Li(SOL)_y$.

31. A functionalized polymer, as set forth in claim 29, where said step of quenching the living polymeric structure includes the use of an agent selected from the group consisting of terminating agents, coupling agents and linking agents.

32. A functionalized polymer, as set forth in claim 31, wherein said terminating agent, coupling and linking agents are selected from the group consisting of carbon dioxide; N,N,N',N'-tetraalkyldiaminobenzophenones; N,N-dialkylaminobenzaldehydes; 1,3-dialkylimidazolidinones; 1-alkyl substituted pyrrolidinones; 1-aryl substituted pyrrolidinones; dialkyl- and dicycloalkyl-carbodiimides having from about 5 to about 20 carbon atoms; $(R_3)_aZX_b$;

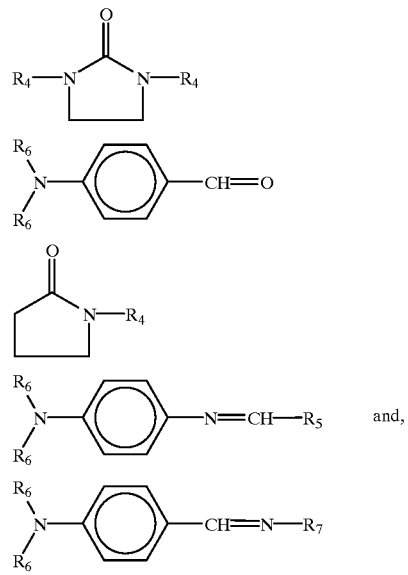

where Z is tin or silicon; $R_3$ is selected from the group consisting of alkyls having from 1 to about 20 carbon atoms, cycloalkyls having from about 3 to about 20 carbon atoms, aryls having from 6 to about 20 carbon atoms and aralkyls having from about 7 to about 20 carbon atoms; X is chlorine or bromine; a is from 0 to 3 and b is from 1 to 4 where a+b=4; each $R_4$ is the same or different and is selected from the group consisting of alkyls, cycloalkyls and aryls, having from 1 to about 12 carbon atoms; $R_5$ is selected from the group consisting of alkyls, phenyls, alkylphenyls and N,N-dialkylaminophenyls, having from about 4 to about 20 carbon atoms; each $R_6$ is the same or different, and is selected from the group consisting of alkyls and cycloalkyls having from 1 to about 12 carbon atoms; and, $R_7$ is selected from the group consisting of alkyls, phenyls, alkylphenyls and N,N-dialkylaminophenyls having from 1 to about 20 carbon atoms.

33. A functionalized polymer prepared by a process comprising the steps of:
initiating polymerization of monomers selected from the group consisting of conjugated dienes having from about 4 to about 12 carbon atoms, monovinyl aromatic monomers having 8 to 18 carbon atoms, trienes, and mixtures thereof, with an initiator that is selected from compounds defined by the formula $(A)Li(SOL)_y$ where Li is a lithium atom, SOL is a divalent moiety selected from the group consisting of hydrocarbons, ethers, and amines, where y is from about 1 to about 3, and A is a cyclic amine radical defined by the formula

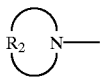

where $R_2$ is selected from the group consisting of an alkylene, substituted alkylene, oxy- or N-alkylaminoalkylene group having from about 3 to about 16 methylene groups, and N is a nitrogen atom; and quenching the polymerization.

34. A functionalized polymer, as set forth in claim 33, where said cyclic amine radical is selected from the group of radicals consisting of pyrrolidine; piperidine; monoalkylpiperazine; perhydroazepine, 1-azacyclooctane; azacyclotridecane; azacycloheptadecane; 1-azacycloheptadec-9-ene; and, 1-azacycloheptadec-8-ene.

35. A functionalized polymer, as set forth in claim 34, where said perhydroazepine is selected from the group consisting of 3,3,5-trimethylhexahydroazepine and hexamethyleneimine.

36. A functionalized polymer, as set forth in claim 33, where said cyclic amine radical is bicyclic.

37. A functionalized polymer, as set forth in claim 36, where said bicyclic functional group is selected from the group consisting of perhydroisoquinoline, perhydroindole and 1,3,3-trimethyl-6-azabicyclo[3.2.1]octane.

* * * * *